INVENTOR.
ROBERT N. ROGERS
BY *m.a.Hobbs*
ATTORNEY

INVENTOR.
ROBERT N. ROGERS

June 19, 1962 R. N. ROGERS 3,039,413
CAN FABRICATING MECHANISM
Filed May 11, 1960 3 Sheets-Sheet 3

*INVENTOR.*
ROBERT N. ROGERS
BY m. a. Hobbs
ATTORNEY

United States Patent Office 3,039,413
Patented June 19, 1962

3,039,413
CAN FABRICATING MECHANISM
Robert N. Rogers, La Porte, Ind., assignor to
Floyd V. Campbell, Elkhart, Ind.
Filed May 11, 1960, Ser. No. 28,368
4 Claims. (Cl. 113—42)

The present invention relates to a can fabricating mechanism and more particularly to a mechanism for drawing, trimming and flanging cans and similar cup-shaped articles.

A conventional method of producing cans and other tubular shaped articles with a closed end, consists in forming the articles from a flat sheet of metal using a punch or plunger and a series of ironing dies, the openings of which decrease in diameter successively from one ironing die to the other until the desired external diameter and wall thickness of the article are obtained. The plunger presses the sheet metal through the dies producing cup-shaped articles which are removed from the plunger in this partially formed condition and transferred to another machine for trimming to eliminate the ragged edge and provide the proper length or height. The articles are then flanged by rolling the free edge around the open end to provide a smooth surface such as that afforded by a partially or fully formed annular bead. It is seen that in this complete can forming operation, three separate machines and fabricating operations are required, and two or three separate handling operations are necessary in moving the partially completed articles successively from the deep drawing mechanism to the trimming and flanging machines. These separate multiple operations for completing the cans require special conveyors and/or operators in addition to those normally operating the press, trimming and flanging machines, and thus prevent articles produced by the foregoing method from being competitive with similar articles produced by other well known can fabricating methods and machines. It is therefore one of the principal objects of the present invention to provide a single mechanism to perform the deep drawing, trimming and flanging operations in a single uninterrupted step without removing the article from the machine until the operation has been completed and without the use of conveyors or other means for handling the partially formed articles between the various operations.

Another object of the invention is to provide a mechanism for forming cans and similar cup-shaped articles, which can readily be assembled in conventional or standard metal fabricating presses and operated by a single operator, and which can be installed at a substantially lower initial cost and thereafter operated at a lower cost than the conventional two or three stage fabricating operation and machines.

Still another object of the invention is to provide a relatively simple, compact mechanism for forming cans and similar cup-shaped articles, which performs the entire deep drawing, trimming and flanging operations without any intermediate manipulations by the operator and which automatically ejects the finished articles and severed scrap material from the press.

A further object is to provide a combination deep drawing, trimming and flanging mechanism of the aforesaid type, which substantially increases the rate of production and at the same time decreases the production costs of the articles, and which is adaptable to the fabrication of cans and other cup-shaped articles of various sizes and of various metals such as aluminum, aluminum alloys, mild steel, copper and brass without any appreciable changes being required in adapting the mechanism to the variations.

Additional objects and advantages of the present invention will become apparent from the following description and accompanying drawings, wherein.

Figure 1:
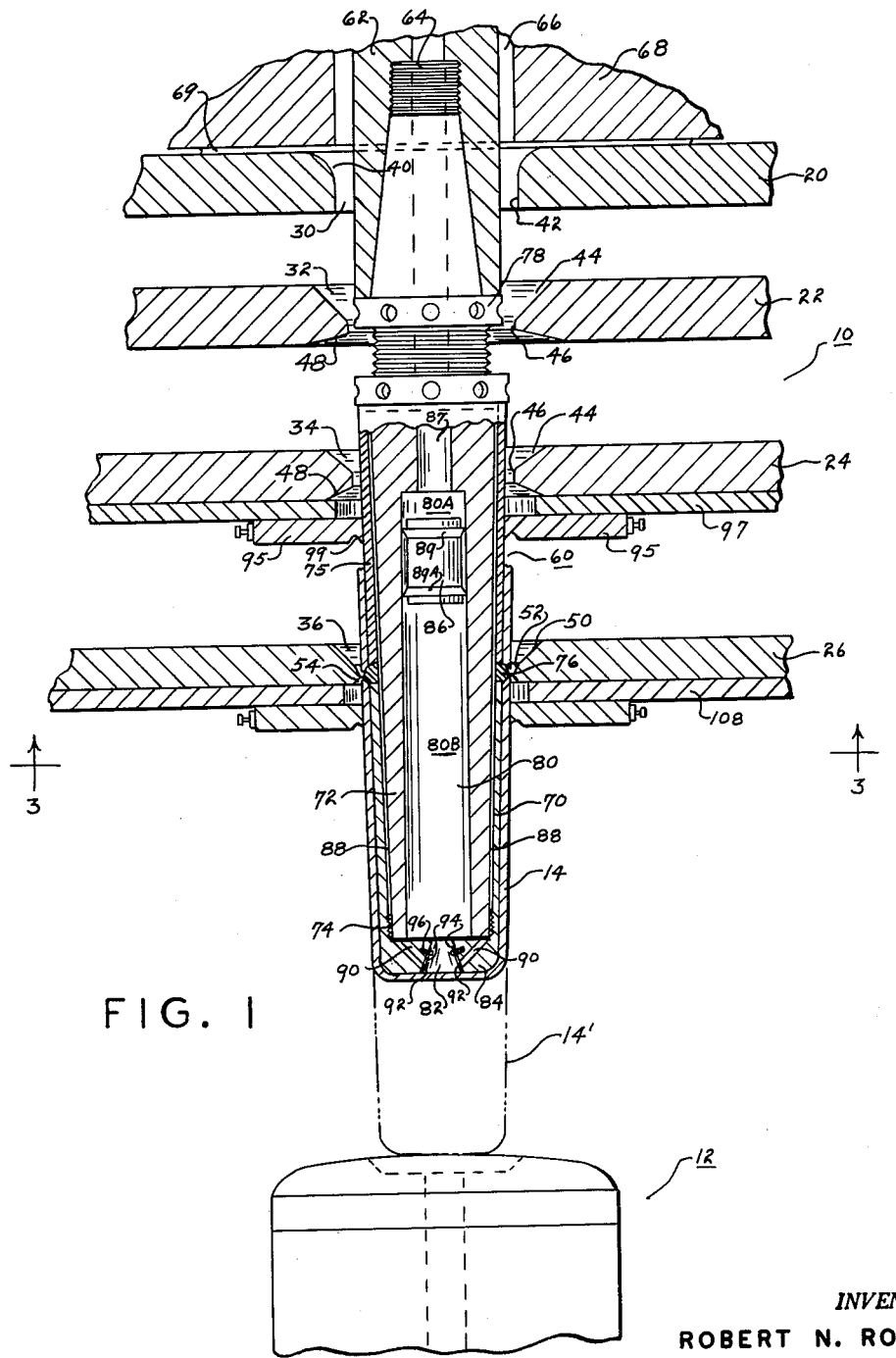
FIGURE 1 is a vertical cross sectional view of the present punch and die assembly and an elevational view of the bottoming die used in conjunction with the assembly for performing the complete operation of the deep drawing, trimming and flanging.

Referring more specifically to the drawings, numeral 10 designates the present punch and die assembly, numeral 12 the bottoming die, 14 a can in the formed condition and in the position for being trimmed, and 14' the same can in position for being flanged, the punch and die assembly and bottoming die being mounted by suitable fixtures in a standard hydraulic press (not shown) extensively used in metal fabricating operations, which may be either a vertical or horizontal type press. In most installations, the ironing dies would normally be held in fixed position and the punch operated by the press plunger, and the bottoming die held in fixed position and the plunger thereof operated to perform the flanging operation.

In the punch and die assembly 10 the die assembly portion consists of die plates 20, 22, 24 and 26 having die openings 30, 32, 34 and 36, respectively, of diminishing diameter from the upper plate to the bottom plate. The plates are one piece members held in fixed spaced relation, as shown in the drawings, by suitable spacers (not shown) disposed between the plates and forming with the plates a rigid die assembly. The opening 30 in plate 20 has an arcuate inwardly extending entrance 40 terminating in a downwardly extending straight cylindrical portion 42, whereas openings 32 and 34 have conically shaped entrances 44 joined to a relatively short cylindrical portion 46 which terminates in an outwardly extending conical section 48. Opening 36 has a conical entrance 50 connected to a second inwardly extending conical portion 52 which terminates in a third conical portion 54 outwardly and downwardly extending from the portion 52. While the contour of the openings in the die plates shown in the drawings is the preferred design, the configuration of the die openings may be varied to satisfy requirements for particular forming operations.

In the assembly 10 the punch 60 is reciprocated by the press through a plunger shaft 62 which is secured to and operated by the head of the press and to which the punch is secured by a threaded neck 64 on the upper end of the punch. At the start of the drawing operation, the punch is raised until it is completely above die plate 20 and confined within a cavity 66 of plunger 68. The blank 69 of sheet metal is initially yieldably held by plunger 68 on the upper surface of die plate 20 preparatory to the deep drawing operation. Punch 60 is cylindrical and is provided with a slight inward and downward taper, and consists of a lower external wall section 70 mounted on an internal stem 72 and held securely in place thereon by a threaded portion 74, an upper wall section 75 and a carbide trimming ring 76 interposed between the two sections, the function of which will be more fully explained hereinafter. Upper section 75 and the carbide ring 76 are held firmly and rigidly in place by a ring 78 threaded on stem 72 above section 75. When sections 70 and 75 and carbide ring 76 are secured in place by ring 78 and threaded portion 74, the entire punch assembly forms in effect a one-piece rigid unit. Stem 72 contains a longitudinally disposed cylindrical chamber 80 extending upwardly from a point near the bottom of the punch, and has an opening 82 in the bottom end 84 for permitting coolant liquid used in the forming operation to enter the lower portion of chamber 80. The chamber contains a free moving piston 86 which separates the chamber into an upper section 80A and a lower section 80B, the upper section being connected to a source of hydraulic fluid by a conduit 87 extending axially through the punch above chamber 80 and through plunger shaft 62. The plunger also contains an air bleed system consisting of a plurality of passages 88 in the wall of stem 72, the lower ends 90 of which extend inwardly and terminate in the wall of opening 82. These passages are normally closed by valves 92 consisting of a small thin metal reed 94 seated over the lower ends of the passages and secured to the portion of stem 72 defining opening 82 by screws 96. The upper ends of the passages are connected to the atmosphere or other source of air, and the reeds form one-way valves which permit air to flow from the source into the bottom of the articles being formed by the punch but prevent the coolant fluid in the article and lower section of chamber 80 from entering and escaping from the articles through passages 88. Piston 86 contains gaskets 89 and 89A sealing the upper section from the lower section of chamber 80, and the piston is movable throughout the length of the chamber.

The punch is sufficiently smaller than the openings of the various die plate openings that the desired thickness of the wall of the cans being formed is maintained throughout the operation, with the exception of the annular area at carbide ring 76. This ring is of such size with relation to opening 36 in plate 26 that the can wall is pinched and/or scored sufficiently at the ring to sever the lower portion of the formed article below the ring from the portion above the ring, as shown in FIGURE 1 of the drawings, the lower portion forming the partially completed can, and the upper wall portion being discarded as scrap. The scrap is removed from the punch as the latter withdraws from the die plates by a plurality of fingers 95 secured to a spacer plate 97 on the underside of plate 24, the fingers being spring loaded and retractable and having a small groove 99 at the edge adjacent the punch to securely engage the upper edge of the scrap ring being removed from the punch.

The can trimmed by the carbide ring in the manner previously explained, is flanged employing four flanger and stripper jaws 100, 102, 104 and 106 secured by bolts 107 to the underside of spacer plate 108 beneath plate 26, in cooperation with bottoming die 12. These four jaws are the same in construction and operation and consist of an inner edge 110 having a groove 112 adjacent thereto substantially completely enclosing the punch. Each jaw includes a spacer 114 and mounting lug 116 and is yieldably urged into position for flanging and stripping the lower portion of the trimmed can by a coil spring 118 reacting between lug 116 and an adjustable stop means 120. The contour of groove 112 is such that a partial or a complete bead may be formed during the flanging operation if desired.

Figure 2:
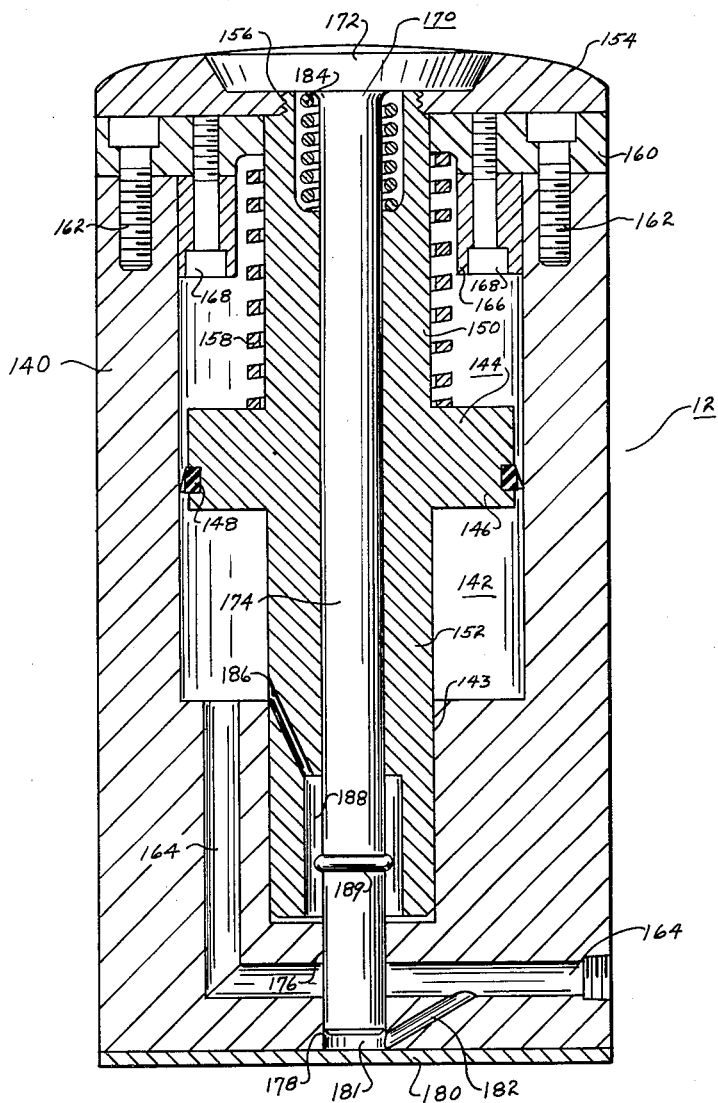
FIGURE 2 is a vertical cross sectional view of the bottoming die shown in FIGURE 1.
Figure 3:
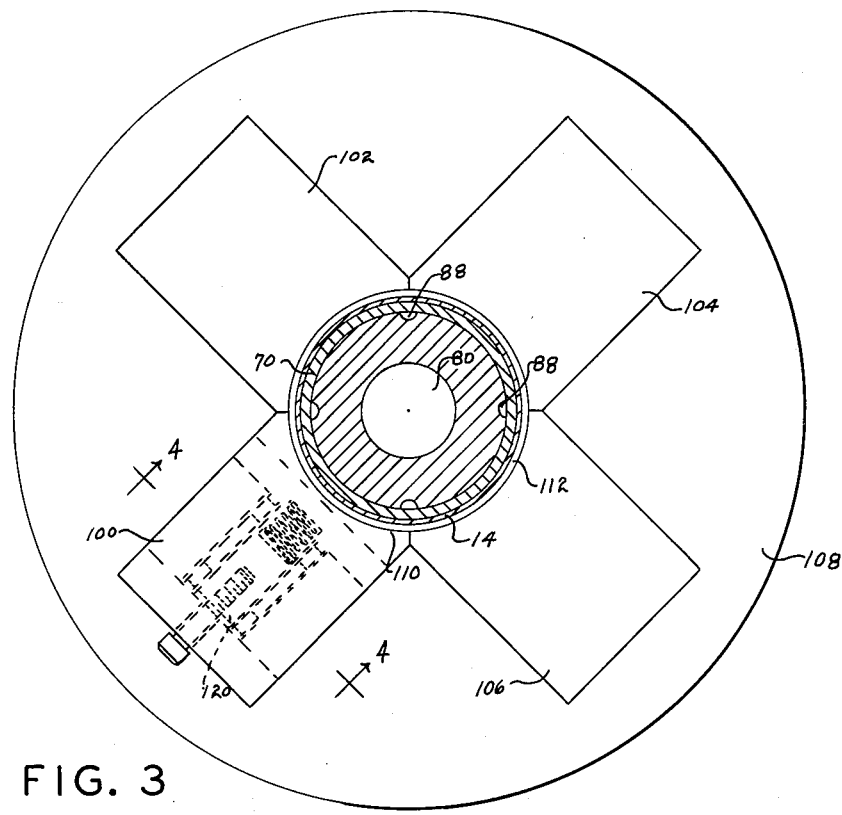
FIGURE 3 is a horizontal cross sectional view of the punch and die assembly taken on line 3—3 of FIGURE 1.
Figures 4, 5:
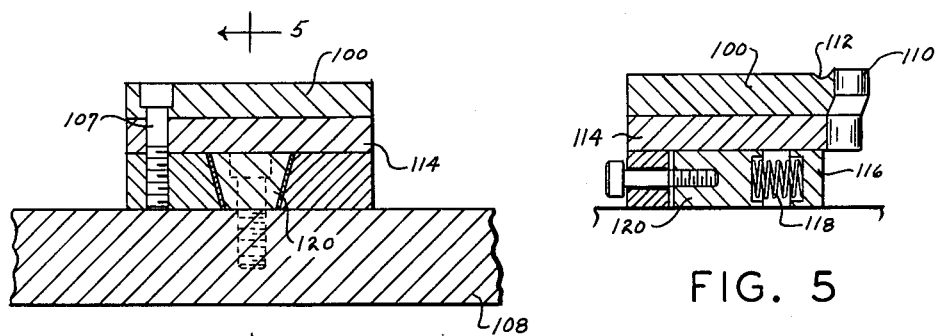
FIGURE 4 is an enlarged vertical cross sectional view of a portion of the flanging mechanism, taken on line 4—4 of FIGURE 3.
FIGURE 5 is an enlarged vertical cross sectional view of the same part of the flanging mechanism shown in FIGURE 4, taken on line 5—5 of the latter figure.
Figure 6:
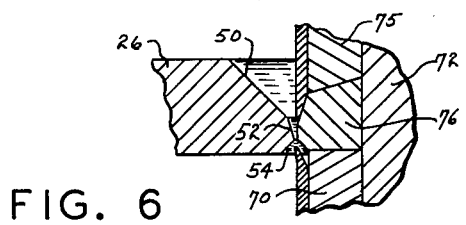
FIGURE 6 is an enlarged fragmentary vertical cross sectional view of a portion of the trimming mechanism shown in FIGURE 1.

Bottoming die 12 consists of a housing 140 having a chamber 142 with an extension 143 in which a piston assembly 144 is mounted, the housing being secured rigidly to the base plate of the press and in most installations being held in fixed position. The piston assembly includes an enlarged center portion 146 with an annular gasket 148 for engaging the wall of chamber 142 and forming a seal therewith, and upper and lower stems 150 and 152 joined integrally with the center portion. The lower stem extends into chamber extension 143 and reciprocates therein, and the upper stem has a plate 154 mounted thereon and secured thereto by threaded portion 156. The piston carrying plate 154 is moved downwardly to the position shown in FIGURE 2 by spring 158 reacting between the upper side of center portion 146 and head member 160 secured to the side walls of the housing by a plurality of bolts 162, and is moved upwardly against the force of the spring by hydraulic fluid supplied under pressure from a suitable source through conduit 164, the upper travel of the cylinder assembly 144 being limited by stop member 166 secured to the underside of head member 160 by bolts 168.

The operation of piston assembly 144 is controlled by a valve 170 consisting of a head 172 and a stem 174 extending longitudinally and completely through the piston assembly and through axially aligned passages 176 and 178 in the bottom of the housing. The lower end of the stem intersects and completely closes conduit 164 when the piston and valve are in the position shown in FIGURE 2. The lower end of passage 178 is closed by bottom plate 180 and the space 181 in said passage beneath the valve stem is connected by passage 182 to the inlet side of conduit 164, and hence the lower end of the stem is subjected to hydraulic pressure tending to open the valve, i.e. raise the stem sufficiently to open conduit 164. A spring 184 is included in the upper end of piston stem 150 to initially start the valve in the opening direction, and a bleed passage 186 and recess 188 in stem 152 connect chamber 142 with extension 143 to permit fluid which would otherwise be trapped in the chamber extension to flow freely to and from the extension as the piston is moved upwardly and downwardly by hydraulic fluid. The valve stem is held in its assembled position by a snap ring 189 around the stem 174 in recess 188.

In the operation of the present can fabricating mechanism, starting with punch 60 fully withdrawn into cavity 66, a sheet metal blank 69 is inserted between plunger 68 and die plate 20 and cavity 66 is filled with coolant fluid in and around the punch and on the upper surface of blank 69. The punch is then advanced downwardly, pressing the blank downwardly through die openings 30, 32, 34 and 36, thereby forming the metal into the cup-shaped form shown in FIGURE 1. As the punch is advanced, the coolant fluid surrounds the punch and flows upwardly in chamber 80, forcing piston 86 into the upper end of the chamber, and the metal of the blank is pressed snugly around the punch and against carbide ring 76. As the ring passes through die opening 36, the clearance between the ring and die is such that the metal of the article wall is pinched and the cup-shaped portion of the article below the ring is severed from the scrap band above the ring. As the formed article mounted on the punch passes between the stripping and flanging jaws 100, 102, 104 and 106, the jaws are retracted by the article applying only a slight amount of force so that the exterior surface of the article is not marred by the jaws.

When the punch with the article mounted thereon reaches the bottoming die, hydraulic fluid in passages 164 and 181 exerts a light pressure on the lower end of valve stem 174 tending to move the valve upwardly, and simultaneously hydraulic fluid in passage 87 and chamber 80A urges piston 86 downwardly in chamber 80 and the coolant fluid in chamber 80B through opening 82 under relatively high pressure. While these two pressures are maintained the article is held firmly against the bottoming die which remains in the position shown in FIGURE 2, and the punch is partially retracted with the coolant from chamber 80 replacing the withdrawn punch in the lower end of the article. After the punch has been retracted a short distance the article starts to move therewith, thereby permitting valve 170 to move upwardly from its seat under the influence of spring 184 and the fluid in space 181, and opening passage 164 into chamber 142. The pressure of the fluid on the underside of piston 144 moves the piston assembly upwardly, carrying plate 154 and the article until the upper edge of the severed article engages the inner edge 110 of the four flanging jaws. Further pressure on piston 144 causes the upper edge of the article to roll outwardly in groove 112 sufficiently to form a bead or a modified form thereof to provide a smooth upper edge on the article. While the article is held against the flanger and stripper jaws, the punch is fully retracted to its initial starting position within cavity 66. During the first portion of this final retracting movement, air is bled through passages 88 and reed valves 92 into the article to prevent the walls thereof from collapsing or becoming otherwise distorted, and as the lower end of the punch passes upwardly between die plates 26 and 24, stripper fingers 95 remove the scrap ring from the punch. Piston assembly 144 is now retracted by relieving the hydraulic fluid pressure in chamber 142 and permitting spring 158 to return the assembly to the original inoperative position shown in FIGURES 1 and 2, and thereby releasing the formed article from the flanger and stripper jaws and permitting it to drop or otherwise be removed from the machine.

Although only one embodiment of the present drawing, trimming and flanging mechanism has been described in detail herein, various changes and modifications may be made without departing from the scope of the invention. Further, subcombinations of the machine, such as the trimmer, may be used separately from the bottoming unit, and other means for trimming the partially formed article may be used with the present flanger and stripper.

I claim:

1. A can fabricating mechanism, comprising four plates in fixed spaced relation having axially aligned die openings therein decreasing in diameter from the first plate to the last plate, a reciprocable punch for passing longitudinally through said openings and extending beyond said last plate and having a longitudinal chamber and a port through the end wall thereof communicating with one end of said chamber and a passage for hydraulic fluid connecting the other end of said chamber with a source of hydraulic fluid, a free floating piston in said chamber between said port and passage, said punch having a supported end and a contact end, a plurality of passages connecting the contact end of the punch with the atmosphere, reed valves permitting air to flow through said passages only to the contact end of said punch, a carbide metal ring around said punch spaced from the end of the punch a distance approximately equal to the height of the can and having an outside diameter substantially equal to the die opening in said last plate, a plurality of fingers for stripping the trimmed material from said punch positioned between the last plate and the adjacent plate in front of said last plate, a plurality of stripping and flanging jaws mounted on the side of said last plate opposite the other plates and being yieldably retractable for engaging the trimmed edge of said article and first forming a flange thereon and then stripping the article from the punch, a bottoming die including a housing having a cylindrical chamber therein in alignment with said punch and a passage for hydraulic fluid under pressure, a head plate movable toward and away from said punch, a piston in said last mentioned chamber for moving said head plate, a valve means controlling said last mentioned passage and having a part contactable by the article being formed for operating the valve to advance said head plate into engagement with the article and thereafter forcing the article against the flanging jaws, and spring means for retracting said head plate.

2. A mechanism for making cup-shaped articles, comprising a series of plates in fixed spaced relation having axially aligned die openings therein decreasing in diameter from the first plate to the last plate, a reciprocable punch for passing longitudinally through said openings and extending beyond said last plate and having a longitudinal chamber and a port through the end wall thereof communicating with one end of said chamber and a passage for hydraulic fluid connecting the other end of said chamber with a source of hydraulic fluid, a free floating piston in said chamber between said port and passage, said punch having a supported end and a contact end, a passage connecting the contact end of the punch with a source of air, a valve permitting air to flow through said last mentioned passage only to the contact end of said punch, a carbide metal ring around said punch spaced from the end of the punch a distance approximately equal to the height of the cup-shaped article and having an outside diameter substantially equal to the die opening in said last plate, a finger for stripping the trimmed material from said punch positioned between the last plate and the adjacent plate in front of said last plate, a plurality of stripping and flanging jaws mounted on the side of said last plate opposite the other plates and being yieldably retractable for engaging the trimmed edge of said article and first forming a flange thereon and then stripping the article from the punch, a bottoming die including a housing having a cylindrical chamber therein in alignment with said punch and a passage for hydraulic fluid under pressure, a head plate movable toward and away from said punch, a piston in said last mentioned chamber for moving said head plate, and a valve means controlling said last mentioned passage and having a part contactable by the article being formed for operating the valve to advance said head plate into engagement with the article and thereafter forcing the article against the flanging jaws.

3. A mechanism for making cup-shaped articles, comprising a series of plates in fixed spaced relation having axially aligned die openings therein decreasing in diameter from the first plate to the last plate, a reciprocable punch for passing longitudinally through said openings and extending beyond said last plate and having a longitudinal chamber and a port through the end wall thereof communicating with one end of said chamber and a passage for hydraulic fluid connecting the other end of said chamber with a source of hydraulic fluid, a free floating piston in said chamber between said port and passage, said punch having a supported end and a contact end, a passage connecting the contact end of the punch with air, a valve permitting fluid to flow through said last mentioned passage only to the contact end of said punch, a carbide metal ring around said punch spaced from the end of the punch a distance approximately equal to the height of the cup-shaped article and having an outside diameter substantially equal to the die opening in said last plate, a finger for stripping the trimmed material from said punch positioned between the last plate and the adjacent plate in front of said last plate, a plurality of stripping and flanging jaws mounted on the side of said last plate opposite the other plates and being yieldably retractable for engaging the trimmed edge of said article and first forming a flange thereon and then stripping the article from the punch, a bottoming die having a head plate movable toward and away from said punch, and a part contactable by the article being formed for advancing said head plate into engagement with the article and thereafter forcing the article against the flanging jaws.

4. A mechanism for making cup-shaped articles, comprising a series of plates in fixed spaced relation having axially aligned die openings therein decreasing in diameter from the first plate to the last plate, a reciprocable punch for passing longitudinally through said openings and extending beyond said last plate and having a longitudinal chamber and a port through the end wall thereof communicating with one end of said chamber and a passage for hydraulic fluid connecting the other end of said chamber with a source of hydraulic fluid, a free floating piston in said chamber between said port and passage, said punch having a supported end and a contact end, a passage connecting the contact end of the punch with air, a valve permitting fluid to flow through said last mentioned passage only to the contact end of said punch, a ring around said punch spaced from the end of the punch a distance approximately equal to the height of the cup-shaped article and having an outside diameter substantially equal to the die opening in said last plate, a finger for stripping the trimmed material from said punch positioned between the last plate and the adjacent plate in front of said last plate, a plurality of stripping and flanging jaws mounted on the side of said last plate opposite the other plates and being yieldably retractable for engaging the trimmed edge of said article and first forming a flange thereon and then stripping the article from the punch, and a bottoming die for forcing the article against the flanging jaws.

References Cited in the file of this patent

UNITED STATES PATENTS

| | | |
|---|---|---|
| 1,043,520 | Higgins | Nov. 5, 1912 |
| 1,720,375 | Parker | July 9, 1929 |
| 2,114,596 | Franghia | Apr. 19, 1938 |
| 2,407,855 | Stephens | Sept. 17, 1946 |
| 2,425,390 | Palmer et al. | Aug. 12, 1947 |
| 2,476,699 | Cline | July 19, 1949 |